US010143255B2

United States Patent
Golnaraghi et al.

(10) Patent No.: US 10,143,255 B2
(45) Date of Patent: Dec. 4, 2018

(54) IMPACT DIVERTING MECHANISM

(71) Applicant: Simon Fraser University, Burnaby (CA)

(72) Inventors: Farid Golnaraghi, West Vancouver (CA); Gaofeng Gary Wang, Surrey (CA); Daniel Eamon Abram, Vancouver (CA); Combiz Jelveh, North Vancouver (CA)

(73) Assignee: Simon Fraser University, Burnaby, British Columbia (CA)

( * ) Notice: Subject to any disclaimer, the term of this patent is extended or adjusted under 35 U.S.C. 154(b) by 328 days.

(21) Appl. No.: 14/992,749

(22) Filed: Jan. 11, 2016

(65) Prior Publication Data

US 2016/0120256 A1 May 5, 2016

Related U.S. Application Data

(63) Continuation of application No. 14/130,257, filed as application No. PCT/CA2012/050449 on Jun. 29, 2012, now Pat. No. 9,323,824.

(60) Provisional application No. 61/503,054, filed on Jun. 30, 2011.

(51) Int. Cl.
*A41D 13/015* (2006.01)
*A42B 3/06* (2006.01)
*F16F 7/12* (2006.01)

(52) U.S. Cl.
CPC ............ *A42B 3/064* (2013.01); *A41D 13/015* (2013.01); *F16F 7/12* (2013.01)

(58) Field of Classification Search
CPC .......... A42B 3/064; A41D 13/015; F16F 7/12
See application file for complete search history.

(56) References Cited

U.S. PATENT DOCUMENTS

| | | | |
|---|---|---|---|
| 4,012,794 A | 3/1977 | Nomiyama | |
| 4,307,471 A | 12/1981 | Lovell | |
| 6,658,671 B1 | 12/2003 | Von Holst et al. | |
| 7,461,726 B2 | 12/2008 | Hawkins et al. | |
| 7,708,653 B2 * | 5/2010 | Hawkins | A41D 13/015 473/329 |

(Continued)

FOREIGN PATENT DOCUMENTS

| | | |
|---|---|---|
| JP | 2001055615 A | 2/2001 |
| JP | 2003518203 A | 6/2003 |

(Continued)

OTHER PUBLICATIONS

Extended European Search dated Mar. 27, 2015, issued in corresponding International Application No. PCT/CA2012/050449, filed Jun. 29, 2012, 6 pages.

(Continued)

*Primary Examiner* — Anna Kinsaul
(74) *Attorney, Agent, or Firm* — Christensen O'Connor Johnson Kindness PLLC

(57) ABSTRACT

An impact diverting mechanism having a top layer and a bottom layer is provided. The two layers are connected such that the top layer is configured to move in relation to the bottom layer when impacted, and therefore is able to divert impact and reduce rotational and linear acceleration on the bottom layer. The impact diverting mechanism may be attached to, or configured to attach to, an object in need of protection, such as a helmet.

20 Claims, 5 Drawing Sheets

(56) References Cited

U.S. PATENT DOCUMENTS

| | | | |
|---|---|---|---|
| 8,156,569 | B2 | 4/2012 | Cripton et al. |
| 8,296,863 | B2 | 10/2012 | Cripton et al. |
| 8,388,164 | B2 | 3/2013 | Waters |
| 8,578,520 | B2 | 11/2013 | Halldin |
| 2001/0032351 | A1 | 10/2001 | Nakayama |
| 2004/0117896 | A1 | 6/2004 | Madey |
| 2004/0168246 | A1 | 9/2004 | Phillips |
| 2004/0250340 | A1 | 12/2004 | Piper et al. |
| 2013/0185837 | A1 | 7/2013 | Phipps et al. |
| 2013/0040524 | A1 | 12/2013 | Halldin et al. |
| 2014/0109298 | A1 | 4/2014 | Faden et al. |

FOREIGN PATENT DOCUMENTS

| | | |
|---|---|---|
| JP | 2006-16740 A | 1/2006 |
| WO | 96/14768 A1 | 5/1996 |
| WO | 01/45526 A1 | 6/2001 |

OTHER PUBLICATIONS

International Search Report and Written Opinion dated Oct. 30, 2012, issued in corresponding International Application No. PCT/CA2012/050449, filed Jun. 29, 2012, 9 pages.

European Office Action dated Mar. 1, 2018, issued in corresponding Application No. EP12805056.4, filed Jun. 29, 2012, 5 pages.

Japanese Notification of Reasons for Refusal dated Feb. 20, 2018, issued in corresponding Application No. JP2016-240161, filed Jun. 29, 2012, 4 pages.

* cited by examiner

IMPACT DIVERTING MECHANISM

CROSS-REFERENCE(S) TO RELATED APPLICATION(S)

This application claims priority to U.S. application Ser. No. 14/130,257, filed Feb. 28, 2014, which is a National Stage of PCT/CA2012/050449, filed Jun. 29, 2012, which claims the benefit of Provisional Application No. 61/1503,054, filed Jun. 30, 2011, the disclosure of which is expressly incorporated herein by reference in its entirety.

FIELD OF THE INVENTION

The present invention relates to an impact diverting mechanism. More particularly, the present invention relates to a mechanism designed to prevent injuries associated with accidents, sports, work-related injuries, falls, and violence, when mounted to protective equipment (e.g., a helmet or body armor).

BACKGROUND

There are varieties of helmet designs. Each of them is suitable for a specific group of activities. In general, a helmet structure consists of a rigid outer shell, an impact absorbing liner, fitting padding, and a retention system. The outer shell's role is to avoid any penetration to the interior of the helmet as well as to distribute the impact load uniformly over the liner. The liner's function is to absorb the energy of impact. Spreading out the impact load increases the energy absorption capacity of the liner. When an impact takes place, the outer shell stops instantly. However, inside the helmet the head keeps moving until it collides with the liner. The liner's role is to bring the head to a "gentle" stop. In other words, the liner's major role is to reduce the absolute value of translational acceleration of the wearer's head. A stiffer liner results in more impact load on the brain during an accident, while a softer liner transmits less impact to the brain.

Present helmets focus primarily on reducing translational acceleration upon impact. However, rotational acceleration may also prove to be injurious. In fact, recent studies have shown that rotational acceleration is a principal cause of head injury. It has been proven that without exceeding the thresholds for head injury with respect to translational acceleration, the rotational acceleration can reach injurious magnitudes. Therefore, it is necessary to improve helmet design to not only reduce the translational acceleration, but also to reduce rotational acceleration.

WO 2010/151631 A1 defines a protective headgear with an outer shell rotatable relative to an inner shell regardless of the direction of an impact load via an intermediate layer disposed between the inner shell and outer shell. The intermediate layers are comprised of a substantially isotropic yielding material that deforms continuously and nonlinearly in the tangential or shear direction. The layer deforms during an impact to allow rotation of the inner shell relative to the outer shell to reduce rotational acceleration of the user's head.

WO 03005844 A1 discloses a protective headgear, which has a feature to reduce rotational acceleration of a user's head during occurrence of an impact. The invention comprises a shell of typical headgear and a single elastomeric outer membrane (the single layer may comprise composite or laminate material), which overlies the outwardly facing surface of the headgear shell. The single elastomeric outer membrane comprises closed cell plasticized polyvinyl chloride, polyethylene, and ethylene-vinyl acetate co-polymers. In addition, a lubricant material may be provided between the shell and outer membrane. As the outer membrane experiences friction force during an impact with an obstacle, the received force causes the outer membrane to move relative to the headgear shell. Since the lubricant material minimizes the friction between the shell and outer membrane, the headgear slides with respect to the impact surface and the membrane. The invention simulates the protective movement of the human scalp relative to the skull. The outer membrane is designed to mimic the scalp, which is not attached firmly to skull, but is instead free to move a limited distance relative to the skull. This mechanism is described as mitigating the injurious effect of the tangential component of the impact force during an impact, and reduces the rotational (i.e., angular) acceleration of the wearer's head.

WO09019667A introduces a coating for a cap of a helmet, wherein the coating comprises a first layer of resilient material having a first surface arranged to be secured to the cap with an adhesive means and a second surface opposite the first surface, and a coating layer, secured with the adhesive means to the second surface of the layer of resilient material. This improves helmet capabilities for safe protection and the coating is easily adaptable on different sizes of helmets.

In general, available helmets provide no protection against rotational accelerations. Therefore, there is a need for an impact diverting mechanism as an effective add-on layer that can be easily installed on the outer shell of almost any type of safety equipment such as helmet by the users or manufacturers.

SUMMARY

In one aspect there is provided an impact diverting mechanism that prevent injuries associated with accidents (e.g. car, motorcycle, bike, etc.), sports activities (e.g. hockey, football, skiing, lugging, climbing, etc.), work-related injuries, falls, and violence.

In another aspect, an impact diverting mechanism is provided. In one embodiment, the impact diverting mechanism includes:

a bottom layer; and a top layer, disposed adjacent to and mechanically connected with the bottom layer, the top layer having an impact surface disposed distal to the bottom layer, wherein the top layer and the bottom layer are able to move relative to each other, and wherein the impact surface is either planar or non-planar;

wherein the top layer and the bottom layer are configured such that during an oblique impact force acting at an impact point on the impact surface of the top layer, the top layer shifts relative to the bottom layer;

wherein the oblique impact force is a vector having a parallel component projected on a plane at the impact point on the impact surface, wherein the plane is either tangential to a non-planar impact surface or coincident with a planar impact surface; and wherein the shift of the top layer relative to the bottom layer diverts and dissipates kinetic energy resulting from the parallel component of the vector of the oblique impact force, thereby reducing rotational acceleration.

In another aspect there is provided an impact diverting mechanism that can mitigate both rotational and linear accelerations during an oblique impact and provide an extra safety.

In another aspect there is provided an impact diverting mechanism that comprises at least two layers movable with respect to each other which allows a temporary or permanent deformation or rupture of the top layer and reduces rotational movement. The bottom layer is fully attached to the outer shell of the protective gear while the top layer(s) is able to move relative to the bottom layer and only connected at certain places to the bottom layer.

In another aspect there is provided an impact diverting mechanism that can cover an outer shell of any kind of a protective head and body equipment as a whole layer or as a cover that consists of a number of compartments in different shapes, placed in a random or uniform pattern connected or not connected to each other.

In another aspect there is provided an impact diverting mechanism with an edgeless design that takes advantage of the full capacity of a surface to reduce rotational acceleration.

In another aspect there is provided an impact diverting mechanism that has the ability to use impact-diverting material in the bottom layer to mitigate impact load more efficiently and therefore reduce linear acceleration of a wearer's head or body.

In another aspect there is provided an impact diverting mechanism that uses any kind of lubricating material between two layers. The said lubricating material is separated from the hard shell, which avoids deterioration of the hard shell over a long period.

Other aspects and features of the present disclosure will become apparent to those ordinarily skilled in the art upon review of the following description of specific embodiments in conjunction with the accompanying FIGURES.

The impact diverting mechanism applications are not limited to personal protective equipments such as protective headgear (e.g., helmets) and body armor. The provided mechanism can be used for any other applications directed to reducing impact forces, particularly reducing rotational acceleration. As a non-limiting example, a vehicle bumper may be improved by incorporating the provided mechanism. The other application of the design is using inside the cabin of aircrafts or interior of vehicles to reduce injuries during incidents that high acceleration or deceleration is involved.

DESCRIPTION OF THE DRAWINGS

Embodiments of the present application will now be described, by way of example only, with reference to the attached FIGURES, wherein.

DETAILED DESCRIPTION

In one aspect, an impact diverting mechanism is provided. In one embodiment, the impact diverting mechanism includes:

a bottom layer; and a top layer, disposed adjacent to and mechanically connected with the bottom layer, the top layer having an impact surface disposed distal to the bottom layer, wherein the top layer and the bottom layer are able to move relative to each other, and wherein the impact surface is either planar or non-planar;

wherein the top layer and the bottom layer are configured such that during an oblique impact force acting at an impact point on the impact surface of the top layer, the top layer shifts relative to the bottom layer;

wherein the oblique impact force is a vector having a parallel component projected on a plane at the impact point on the impact surface, wherein the plane is either tangential to a non-planar impact surface or coincident with a planar impact surface; and wherein the shift of the top layer relative to the bottom layer diverts and dissipates kinetic energy resulting from the parallel component of the vector of the oblique impact force, thereby reducing rotational acceleration.

Figure 9:
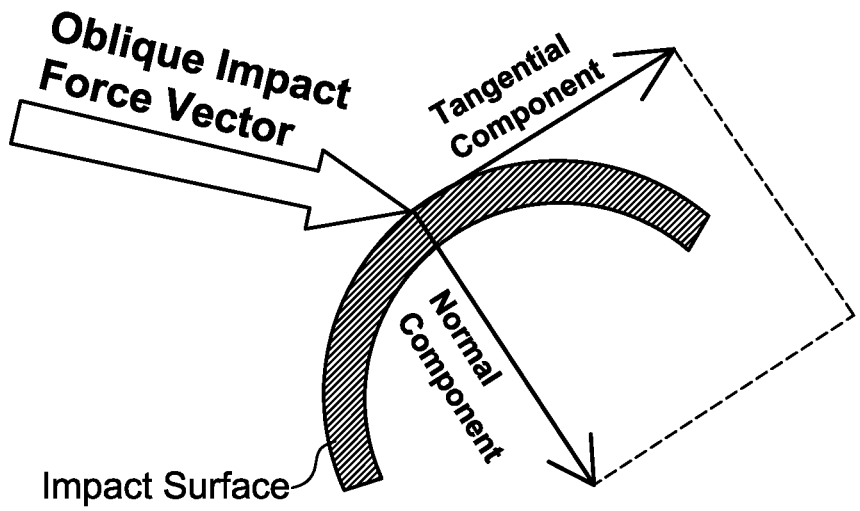
FIG. 9 is a diagram illustrating the forces involved in an impact on a representative impact diverting mechanism in accordance with the disclosed embodiments.

The frame of reference for the disclosed embodiments is illustrated in FIG. 9, wherein an oblique impact force vector represents an object striking the impact surface at an oblique angle. The vector has a tangential component and a normal component. The impact surface need not be round, as illustrated, but may also be flat.

Figure 1:
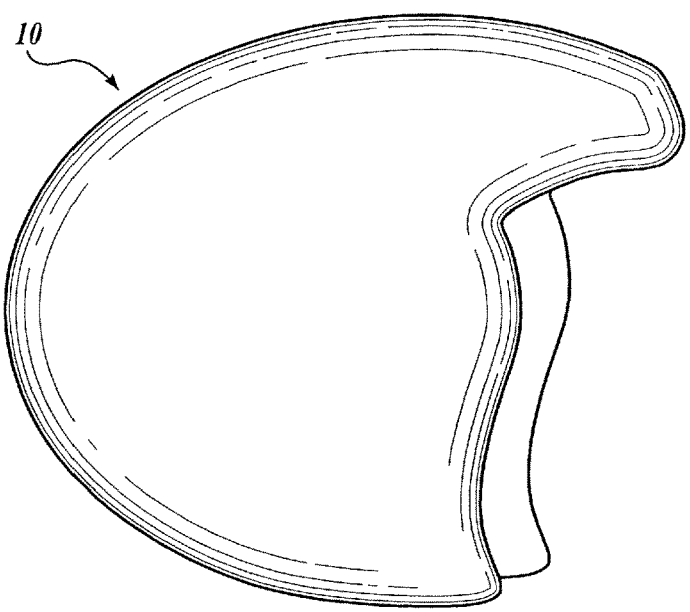
FIG. 1 shows a side view of a helmet.

With reference to the FIGURES, the embodiments provided herein include an impact diverting mechanism 16, which can optionally be added as a protective add-on to a helmet 10 or other equipment for protection (e.g., for protection of a wearer's head or body from injuries). A typical helmet 10, as known in the prior art, is illustrated in FIG. 1 The mechanism 16 is illustrated as attached to a helmet 10 in FIG. 2.

For simplicity and clarity of illustration, reference numerals may be repeated among the FIGURES to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The mechanism 16 comprises a bottom layer 18 that is mechanically attached to a top layer 22 disposed above the bottom layer 18. The top layer 22 protects the bottom layer 18 by reducing rotational acceleration when the mechanism is impacted at an oblique angle.

The bottom layer 18 is attached to an outer shell 12 of the helmet 10 in the illustrated representative embodiment. When the mechanism described herein is mounted to, or configured to mount to, an object such as a helmet, the bottom layer is the layer closest to the object and a top layer is the layer distal to the object.

Figure 2:
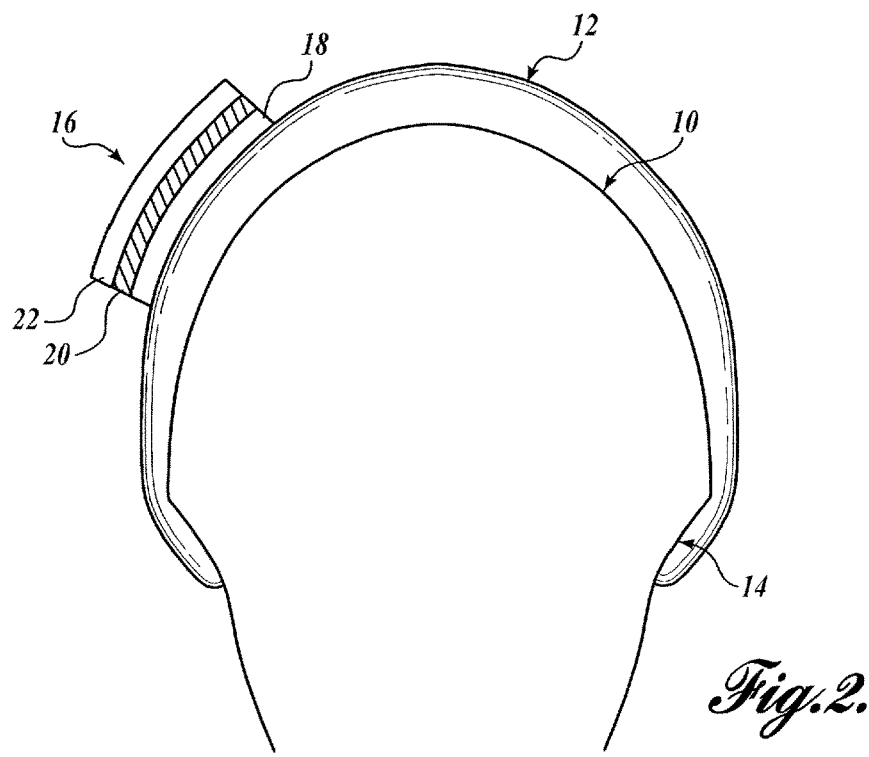
FIG. 2 shows a cross sectional view of an impact diverting mechanism in accordance with the embodiments provided herein mounted on an outer shell of a helmet.

The bottom layer 18 is fixedly or otherwise solidly attached to the surface 12 of the outer shell by means of an adhesive or mechanical fastening as shown in FIG. 2. The bottom layer 18 is made from thermosetting plastics (e.g., silicone), conventional thermoplastic, thermoset elastomers such as polyurethane elastomers, natural or synthetic rubbers, plasticized foams, or low- or high-density polyethylene.

The bottom layer 18 can be a plain layer, a composite layer, or a layer comprising chambers. If chambers are included, the chambers contain dilatant (shear thickening) material (viscosity increases with the rate of shear strain) such as d3o™ or the like, that reduces the linear acceleration applied by an impact load on the protective equipment. In certain embodiments, other shock absorbing materials or mechanisms are used to reduce linear acceleration even further.

The intermediate layer 20 of lubricating material facilitates the movement of the top layer 22. In one embodiment, illustrated in FIG. 5, the top layer 22a is a plain layer (i.e., nothing is added to the polymer to make it a composite) of flexible and stretchable material(s) such as thermosetting plastics (e.g., silicone), conventional thermoplastic, thermoset elastomers such as polyurethane elastomers, natural or synthetic rubbers, plasticized foams, or low- or high-density polyethylene. In one embodiment, the top layer and the bottom layer are made of elastic or inelastic materials, such as thermosetting plastics, conventional thermoplastics, or thermoset elastomers.

The top layer top layer 22 is arranged to be placed over an optional intermediate layer 20, which is disposed between the top 22 and bottom 18 layers. With regard to the intermediate layer 20, in certain embodiments, the intermediate layer 20 is an independent layer, but in certain embodiments the top and/or bottom layer is self-lubricating in order to facilitate movement between the layers. In one embodiment, there is lubrication between the top layer and the bottom layer selected from the group consisting of self-lubrication on the top layer, self-lubrication on the bottom layer, an independent lubricant between the top layer and the bottom layer, and combinations thereof.

The intermediate layer 20 is a lubricating material or gel able to facilitate relative motion between the top layer 22 and the bottom layer 18. Separation of lubricating material from the hard shell 12 is to avoid possible deterioration of the hard outer shell 12 over a long period, and this embodiment can be used for any type of hard shell 12.

In embodiments that do not include the intermediate layer 20, the top layer 22 and the bottom layer 18 may abut or may be separated by a gap, while still being mechanically connected.

Figure 10:
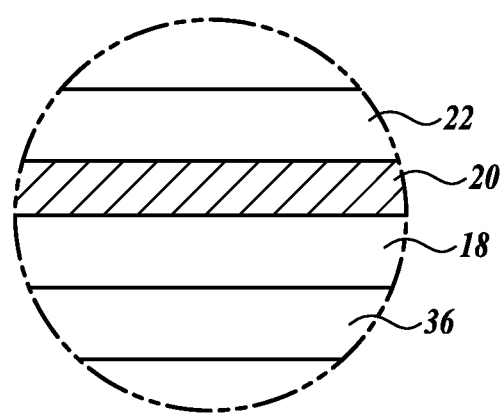
FIG. 10 is a cross-sectional detail view of the impact diverting mechanism attached to an interior surface of an object in accordance with the embodiments provided herein.

While the embodiments described herein generally refer to applying the mechanism 16 to a helmet (e.g., helmet 10 of FIG. 2), it will be appreciated by those of skill in the art that the mechanism 16 can be applied to cover an outer surface of any kind of protective equipment (e.g., personal protective equipment) as a whole layer or as a cover that consists of a number of compartments in different shapes, placed in a random or uniform pattern connected or not connected to each other. As best shown in FIG. 10, in some embodiments, the bottom layer 18 is configured to attach to an interior surface of an object 36. As shown most clearly in FIG. 2, in some embodiments, the top layer 22 and the bottom layer 18 are smaller than the area of an outer surface of the hard outer shell 12 of the helmet 10.

The layers of the mechanism 16 are configured such that during an oblique impact, the top layer 22 goes through temporary or permanent deformation or ruptures and moves relative (e.g., laterally) to the bottom layer 18 to reduce rotational acceleration. Accordingly, in one embodiment, the bottom layer and the top layer are configured such that the top layer shifts substantially laterally relative to the bottom layer as a result of the oblique impact force acting on the top layer. As used herein, the term "substantially laterally" describes movement that is greater in the tangential direction than in the perpendicular direction, as illustrated in FIG. 9.

In another embodiment, the top layer ruptures or is permanently deformed when impacted.

The representative embodiments described herein typically include an object (e.g., a helmet), onto which the impact diverting mechanism is mounted or otherwise attached. However, in certain embodiments, the impact diverting mechanism is not mounted to an object. Instead, the impact diverting mechanism can be configured to attach to an object in need of protection. In one embodiment, the bottom layer is configured to be fixedly attached to the surface of an object, and wherein the impact diverting mechanism is configured to reduce rotational acceleration of the object when exposed to the oblique impact force compared to the rotational acceleration of the object without the impact diverting mechanism when exposed to the oblique impact force.

In a further embodiment, the bottom layer is attached to the object using an adhesive, co-molding, mechanical means, a peel-and-stick material, or any other method of attachment. Such adhesives are well known to those of skill in the art.

In one embodiment, the bottom layer is attached to the object, and wherein the object is the outer layer of a protective gear or armor, and wherein the attachment is at one or more locations using an adhesive or mechanical means.

In one embodiment, the outer surface of the top layer has a surface selected from the group consisting of smooth, flat, and a texture for a better mechanical grip during the oblique impact force.

Figure 3:
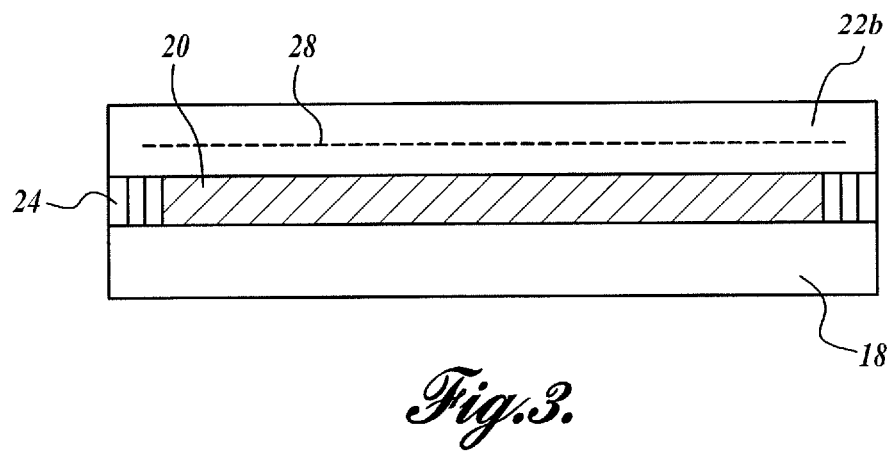
FIG. 3 shows a cross sectional view of a top layer and a bottom layer attached to each other by attaching the edges of an impact diverting mechanism in accordance with the embodiments provided herein.
Figure 4:
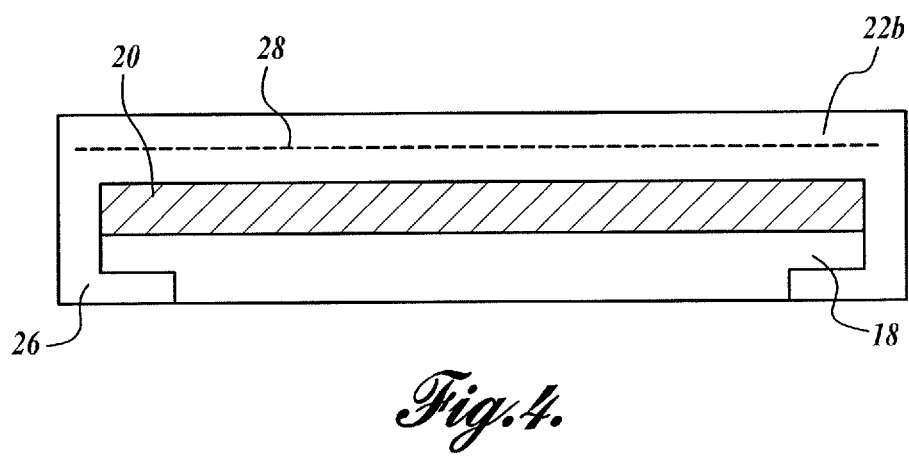
FIG. 4 shows a cross sectional view of a top layer with extra edges folded underneath the bottom layer of an impact diverting mechanism in accordance with the embodiments provided herein.

In certain embodiments, illustrated in FIGS. 3 and 4, the top layer 22 is an armored layer 22b (e.g., a composite layer comprising a polymer and an additive) comprising a small flat discs 28 made from a flexible and stretchable material(s). A procedure of making the armored layer 22b is making a flexible thin layer first, then placing the small flat discs 28 on the first layer, and then adding a second layer of flexible material on the top. After curing, the top layer 22b is one united layer with the flat small discs 28 spreading in between the layer 22b (e.g., similar to fish scales). The outer surface of the top layer employs a texture to increase the grip between the top layer and the impact area resulting in a better performance of the top and bottom layer.

In another embodiment the top layer 22 contains particles with relatively high stiffness (e.g., embedded as a composite in the top layer 22). Such particles reinforce the layer 22 against impact load and/or improve the sliding ability of the top layer 22 on the lubricant 20 and the bottom layer 18. On the other hand, existence of the particles does not increase the general stiffness of the layer 22, as the particles are separate and allow the elastic top layer 22 to keep its flexibility and stretchability. This type of layer can significantly reduce the rotational acceleration and also is more resilient to work on rough surfaces.

In one embodiment, one or more additional layers are added on the top layer, including one or more lubricated layers and reinforced layers free to move relative to each other.

Figure 6A:
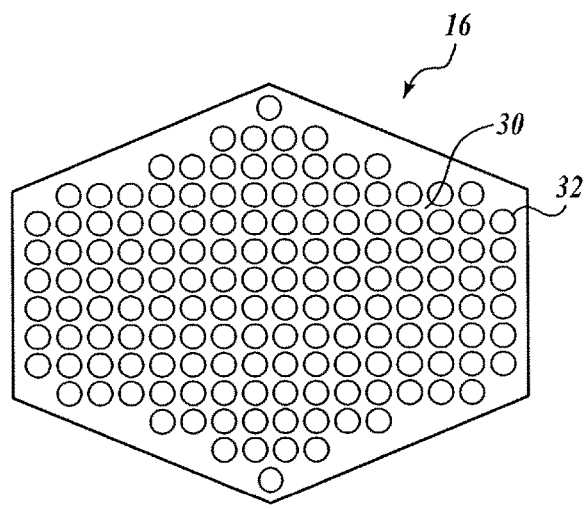
FIGS. 6A and 6B show a top view (FIG. 6A) and a cross-sectional view (FIG. 6B) of an impact diverting mechanism with a number of small ball bearings in accordance with the embodiments provided herein.
Figure 6B:
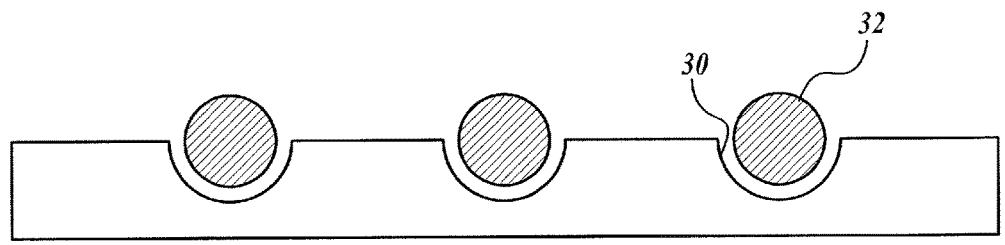

In another aspect, a diverting mechanism is provided that comprises a casing layer 30 for a number of small balls 32 wherein the individual balls 32 are in their casings 30 and are free to rotate, as illustrated in FIGS. 6A and 6B. The elastic layer contains small the rigid casings that balls can freely rotate inside. Therefore, there is no lubrication layer as in other designs provided herein. Also, lubrication might be used inside casing to improve the rotations of the balls. During an oblique impact, the rotation of these small balls 32 in their casings 30 allows the helmet 10 to slide instead of roll, thus decreasing the rotational acceleration.

The top layer 22 is attached to the bottom layer 18 by different methods as shown in FIGS. 3, 4, 5, 7 and 8. Referring now to FIG. 3, the top layer 22*b*, which comprises small flat discs 28, and the bottom layer 18, are attached to each other by an attachment edge 24 (i.e., a tongue and groove are designed for the two layers for attachment).

In one embodiment, the top layer is attached to the bottom layer around the perimeter. In a further embodiment, the two layers are connected throughout a portion of their adjacent surfaces but not throughout their entire adjacent surfaces.

In another embodiment the top layer 22 comprises extended edges 26 extending outwardly in order to be folded underneath the bottom layer 18 as shown in FIGS. 4, 5, 7 and 8. Using extended edges 26 can create an "edgeless" design so as to allow for fewer sharp edges on the helmet and to improve aesthetics. Using the edgeless design, if the impact applies to the perimeter of the impact diverting mechanism 16, the mechanism is still functional and the helmet 10 can slide on. The difference between edgeless design and designs with inactive edges can be observed better if a protective layer needs to be installed on the helmet with no access to the helmet's actual perimeter edges to hide.

The edgeless design can be created only by using two layers. Using the edgeless design, if the impact applies to the perimeter of the impact diverting mechanism, it is still functional and the helmet can slide on. Using only one layer, attaching the boundary of the outer layer to the hard shell can create inactive edges. Hitting the inactive edges of the outer layer does may not reduce rotational acceleration as effectively as the edgeless design. The difference between edgeless design and designs with inactive edges can be observed better if a protective layer needs to be installed on the helmet with no access to the helmet actual perimeter edges to hide.

Figure 5:
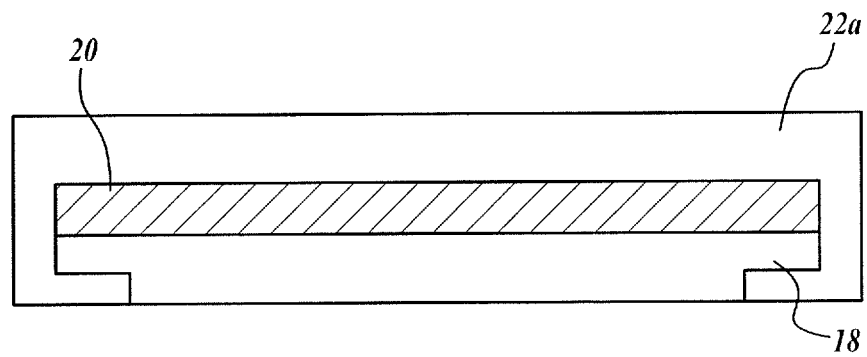
FIG. 5 shows a cross sectional view of a top layer with extra edges folded underneath the bottom layer of an impact diverting mechanism in accordance with the embodiments provided herein.
Figure 7:
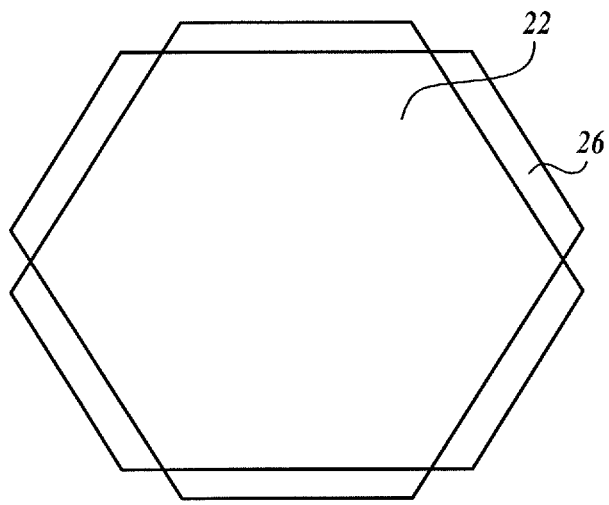
FIG. 7 shows a top view of a top layer of an impact diverting mechanism with an extra edge in accordance with the embodiments provided herein.

Referring now to FIG. 7, a top view of a top layer 22 of an impact diverting mechanism 16 with a plurality of extended edges 26 is illustrated, in accordance with the embodiments provided herein. The extended edges 26 are shaped as tabs that can then be folded under an overhanging edge (e.g., margin area 34 in FIG. 8) of the bottom layer 18, as illustrated in FIGS. 4 and 5, or under an edge of the helmet 10 upon which the mechanism 16 is mounted.

Figure 8:
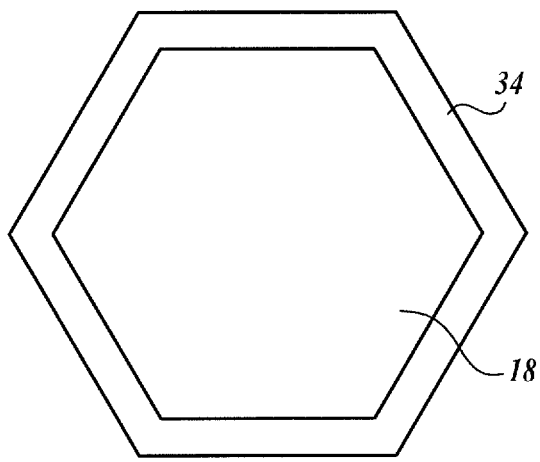
FIG. 8 shows a top view of a bottom layer with a margin area for placing the extra edge of the top layer from FIG. 7 underneath it in accordance with the embodiments provided herein.

Referring now to FIG. 8 a top view of a bottom layer 18 with a margin area 34 for placing the extended edge 26 of the top layer from FIG. 7 underneath it in accordance with the embodiments provided herein.

Further in another embodiment, the top and bottom layers are one whole part without any attaching borders.

The mechanism 16 reduces rotational acceleration during an oblique impact and will provide extra safety to the wearer of such a helmet 10. In addition to the impact diverting mechanism 16, the layers of the mechanism 16 (or add on layers) can be created from shock-absorbing materials such as shear thickening (dilatant) materials to not only protect against rotational acceleration but also mitigate linear acceleration experienced by the wearer's head and body.

Some of the benefits of having both a top layer 22 and a bottom layer 18 (separated by a lubricant 20) compared to a single layer protection mechanism, include:

The enablement of an edgeless design (FIGS. 4, 5, 7, and 8), which takes advantage of the full capacity of the surface area available to reduce rotational acceleration, higher reduction of rotational acceleration;

Easier installation of the mechanism 16, particularly as an add-on for covering only certain areas of a helmet;

Separation of lubricating material 20 from the hard shell 12 to avoid possible deterioration of the hard shell 12 over a long period of use and easier installation, therefore, the mechanism 16 can be used for any type of hard shell; and The ability to use impact diverting material in the bottom layer 18 to mitigate the impact load more efficiently and therefore reduce linear acceleration of wearer's head.

In one embodiment, the mechanism includes a gap between the top layer and the bottom layer.

In one embodiment, the bottom layer is attached to the object, and wherein the object is a vehicle, aircraft, or other object exposed to an oblique impact force.

In one embodiment, the bottom layer is attached to an interior of the object.

In one embodiment, the object is the passenger compartment of an airplane, automobile, train, or other vessel exposed to an oblique impact force.

In one embodiment, the outer surface of the top layer has illuminating materials or devices embedded to improve its visibility in low light conditions.

In one embodiment, the outer surface of the first or top layer is configured to display information.

In one embodiment, the information is an advertisement, logo, trademark, certification label, warning label, serial number, or the like.

In one embodiment, the impact diverting mechanism reduces linear acceleration of the object when exposed to the oblique impact force, compared to the linear acceleration of the object without the impact diverting mechanism when exposed to the oblique impact force.

In one embodiment, the top layer is configured to attach to the object as well as to the bottom layer.

In one embodiment, any of the layers is an integral part of any other layer.

In one embodiment, any of the layers is independent of any other layer.

In one embodiment, the top layer includes particles with relatively high stiffness that improves the ability of the top layer to shift relative to the bottom layer.

In one embodiment, the impact diverting mechanism is configured to reduce linear acceleration of the bottom layer relative to the top layer.

In one embodiment, the bottom layer is a plain layer, a composite layer, or a layer comprising chambers.

In one embodiment, the top layer or the bottom layer comprises a laminate structure.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. An impact diverting mechanism couplable to protective equipment, comprising:
    a bottom layer couplable to a portion of an interior surface of the protective equipment; and
    a top layer, disposed adjacent to and mechanically connected around a perimeter of the bottom layer, the top layer having an impact surface disposed distal to the bottom layer, wherein the top layer and the bottom layer are able to move relative to each other, and wherein the impact surface is either planar or non-planar;
    wherein the top layer and the bottom layer are configured such that during an oblique impact force acting at an impact point on the impact surface of the top layer, the top layer shifts relative to the bottom layer and the interior surface of the protective equipment;
    wherein the bottom layer is couplable to a portion of the interior surface of the protective equipment;
    wherein the top layer and the bottom layer are flexible such that the impact diverting mechanism conforms to the interior surface of the protective equipment upon coupling;
    wherein the oblique impact force is a vector having a parallel component projected on a plane at the impact point on the impact surface;
    wherein the plane is either tangential to a non-planar impact surface or coincident with a planar impact surface; and
    wherein the shift of the top layer relative to the bottom layer diverts and dissipates kinetic energy resulting from the parallel component of the vector of the oblique impact force, thereby reducing rotational acceleration and linear acceleration of the protective equipment.

2. The impact diverting mechanism of claim 1, wherein there is lubrication between the top layer and the bottom layer selected from the group consisting of self-lubrication on the top layer, self-lubrication on the bottom layer, an independent lubricant between the top layer and the bottom layer, and combinations thereof.

3. The impact diverting mechanism of claim 1, wherein the bottom layer and the top layer are configured such that the top layer shifts substantially laterally relative to the bottom layer as a result of the oblique impact force acting on the top layer.

4. The impact diverting mechanism of claim 1, wherein the top layer and the bottom layer are made of elastic or inelastic materials.

5. The impact diverting mechanism of claim 4, wherein the elastic or inelastic materials are selected from the group consisting of thermosetting plastics, conventional thermoplastics, and thermoset elastomers.

6. The impact diverting mechanism of claim 1, wherein the top layer is made of plasticized foam.

7. The impact diverting mechanism of claim 1, wherein multiple impact diverting mechanisms are coupled to a single protective equipment.

8. The impact diverting mechanism of claim 1, wherein both the top layer and the bottom layer comprise composite or laminate materials.

9. The impact diverting mechanism of claim 1, wherein at least one of the top layer and the bottom layer is reinforced.

10. The impact diverting mechanism of claim 1, wherein at least one of the top layer and the bottom layer includes a shock absorbing material.

11. The impact diverting mechanism of claim 10, wherein the shock absorbing material is a dilatant.

12. The impact diverting mechanism of claim 1, wherein one or more additional layers are added on the top layer, including one or more lubricated layers and reinforced layers free to move relative to each other.

13. The impact diverting mechanism of claim 1, wherein the outer surface of the top layer has a surface selected from the group consisting of smooth, flat, and a texture for a better mechanical grip during the oblique impact force.

14. The impact diverting mechanism of claim 1, wherein the bottom layer is further couplable to the interior surface of the protective equipment using co-molding, mechanical means, a peel-and-stick material, or any other method of attachment.

15. The impact diverting mechanism of claim 14, wherein the impact diverting mechanism is couplable at one or more locations on the interior surface of the protective equipment.

16. The impact diverting mechanism of claim 1, wherein the protective equipment is configured to be worn on a part of a user's body selected from the group consisting of the head, neck, shoulders, upper arms, elbows, forearms, wrists, hands, chest, back, spine, hips, thighs, knees, shins, ankles, and feet.

17. The impact diverting mechanism of claim 1, wherein the protective equipment is a helmet.

18. The impact diverting mechanism of claim 1, wherein the protective equipment is wearable apparel.

19. The impact diverting mechanism of claim 1, wherein the top layer and the bottom layer further comprise an advertisement, a logo, a trademark, a certification label, a warning label, or a serial number.

20. The impact diverting mechanism of claim 7, wherein the multiple impact diverting mechanisms are coupled to each other.

* * * * *